US012750387B2

(12) United States Patent
Wang et al.

(10) Patent No.: US 12,750,387 B2
(45) Date of Patent: Sep. 29, 2026

(54) TRENDING TOPIC TRACKER FOR PROACTIVE DOMAIN ABUSE MONITORING

(71) Applicant: Palo Alto Networks, Inc., Santa Clara, CA (US)

(72) Inventors: Shu Wang, San Jose, CA (US); Zhanhao Chen, Santa Clara, CA (US); Chi-Wei Lu, Sunnyvale, CA (US); Zhenyu Mao, Milpitas, CA (US); Ting-Hsuan Hsu, Cupertino, CA (US); Fan Fei, Pleasanton, CA (US); Daiping Liu, Sunnyvale, CA (US); Xing Wang, Cupertino, CA (US); Jiaqi Wu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 19/032,580

(22) Filed: Jan. 21, 2025

(65) Prior Publication Data

US 2026/0214109 A1 Jul. 23, 2026

(51) Int. Cl.
*H04L 9/40* (2022.01)

(52) U.S. Cl.
CPC ...... *H04L 63/1425* (2013.01); *H04L 63/1466* (2013.01)

(58) Field of Classification Search
CPC . H04L 63/14; H04L 63/1408; H04L 63/1425; H04L 63/1441; H04L 63/1466
See application file for complete search history.

(56) References Cited

U.S. PATENT DOCUMENTS

2023/0098812 A1* 3/2023 Rivlin ................. H04L 63/0236 726/22
2024/0406198 A1* 12/2024 Pan ..................... H04L 63/1425
2026/0039674 A1* 2/2026 Siekman ............. H04L 63/1425

* cited by examiner

*Primary Examiner* — D'Arcy Winston Straub
(74) *Attorney, Agent, or Firm* — Gilliam IP PLLC

(57) ABSTRACT

A domain abuse detection system periodically retrieves trending topics, topic attributes, and interest metrics data from data sources. The domain abuse detection system also prompts a language model to generate a list of tokens for each trending topic based on the topic attributes, as well as retrieved web content related to the topic. The domain abuse detection system then analyzes the trending topics to identify "hot" and "rising" topics based on the interest metrics data. The domain abuse detection system prompts a language model to identify which of the hot and rising topics are exploitable for domain abuse. For each exploitable topic, the domain abuse detection system searches domain related databases (e.g., domain registration databases) for domain entities based on the tokens. ring) and generate a domain abuse report.

20 Claims, 5 Drawing Sheets

TRENDING TOPIC TRACKER FOR PROACTIVE DOMAIN ABUSE MONITORING

BACKGROUND

The disclosure generally relates to analysis of trending topics for the purposes of identifying malicious domains (e.g., subclass CPC H04L 63/1483).

A "newly registered" domain is a domain that has been registered for a first time, registered after expiration, or a domain that has changed ownership. Thousands of newly registered domains occur each day, many of which are suspicious. And many of those suspicious newly registered domains are malicious because of an intent to misuse the domains for malicious purposes, referred to as domain abuse. The malicious purposes include phishing attacks, command and control attacks, and malware distribution. Bad actors use different techniques to create domain names that resemble legitimate domain names. Some of these techniques include typosquatting, homoglyph attacks, and sub-domain hijacking. Typosquatting leverages expected typographical errors to create domain names, such as adding additional letters (e.g., "ollymmpic"). Homoglyph attacks leverage character similarity to create domain names (e.g., "0lympic" with a zero instead of an O). Sub-domain hijacking or subdomain takeover can occur when a subdomain is no longer used by a legitimate owner, but a CNAME continues for the subdomain despite retirement of the fully qualified domain name (FQDN). A bad actor registers the FQDN and receives traffic via the CNAME.

BRIEF DESCRIPTION OF THE DRAWINGS

Embodiments of the disclosure may be better understood by referencing the accompanying drawings.

FIG. 1 is a high-level diagram that illustrates the general flow of data between the domain abuse detection system and external actors to generate a domain abuse report.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Domain abuse capitalizes on trending or popular events. Many domains will be newly registered corresponding to popular events, such as elections and sports events, for legitimate uses. Malicious actors capitalize on the popularity of the event and effectively blend the abuse of domains among the volume of registrations corresponding to the popular/trending event. This mix of registrations correlated to a same trending/popular event creates a challenge for detecting abused domains. In addition, the short-lived nature of popularity does not facilitate the creation of a long history of traffic to identify malicious behavior patterns and correlate to a domain.

A domain abuse detection system is disclosed herein which proactively identifies domains abused or likely to be abused based on trending topics data and generative artificial intelligence (AI). The domain abuse detection system periodically retrieves trending topics, topic attributes, and interest metrics data from data sources. The domain abuse detection system also prompts a language model to generate a list of tokens for each trending topic based on the topic attributes, as well as retrieved web content related to the topic. The domain abuse detection system then analyzes the trending topics to identify "hot" and "rising" topics based on the interest metrics data. The domain abuse detection system prompts a language model to identify which of the hot and rising topics are exploitable for domain abuse. For each exploitable topic, the domain abuse detection system searches domain related databases (e.g., domain registration databases) for domain entities based on the tokens. For each domain entity in the search results, the domain abuse detection system performs analysis to identify abused domains or likely to be abused domains. The domain abuse detection system can also perform additional analysis (e.g., trend analysis or clustering) and generate a domain abuse report. The domain abuse detection system allows for proactive detection of abuse domains within hours rather than days of registration.

EXAMPLE ILLUSTRATIONS

Figure 1:
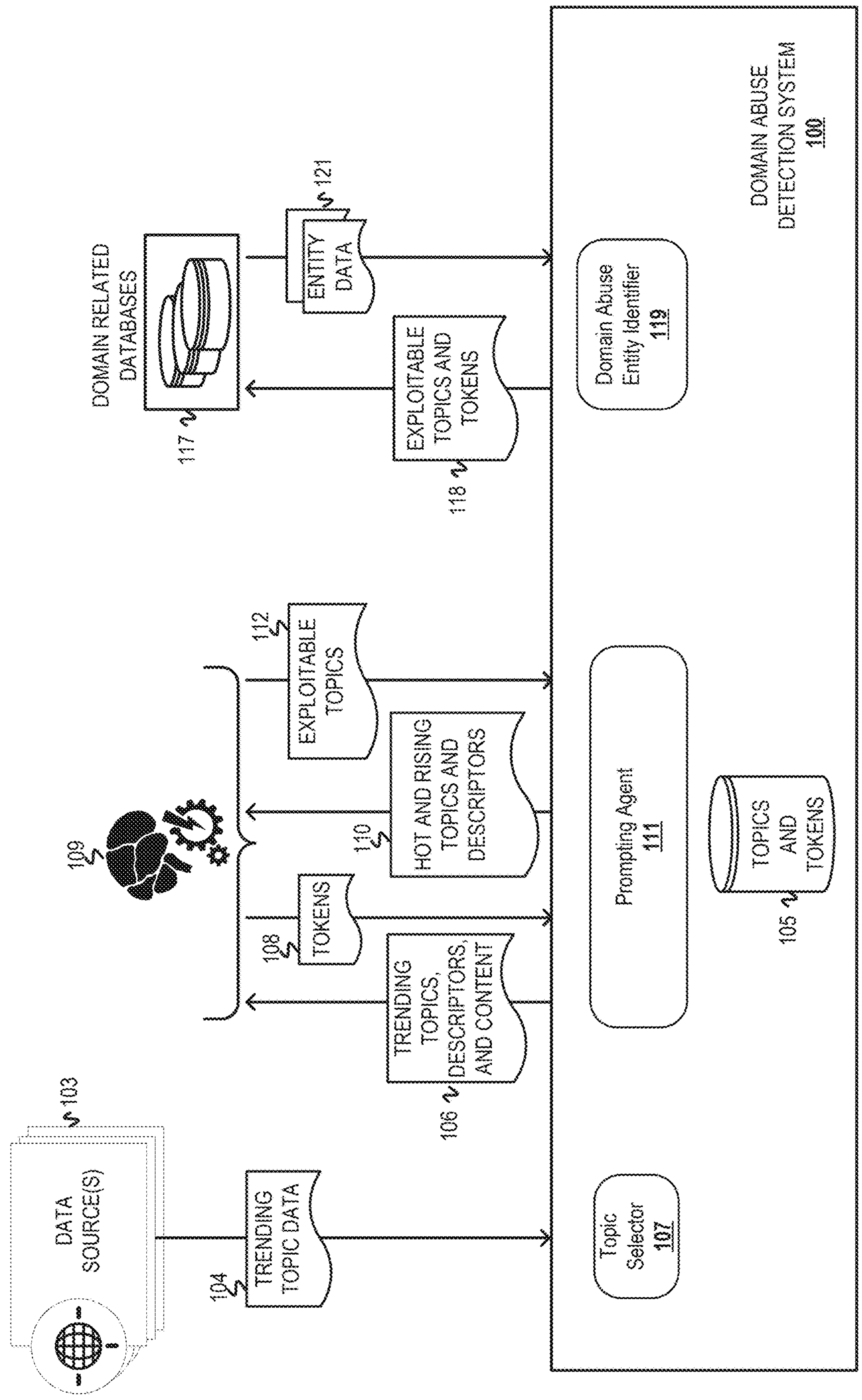
FIG. 1 is a diagram that illustrates a domain abuse detection system and general data flow among components of the domain abuse detection system and external components.
Figure 2:
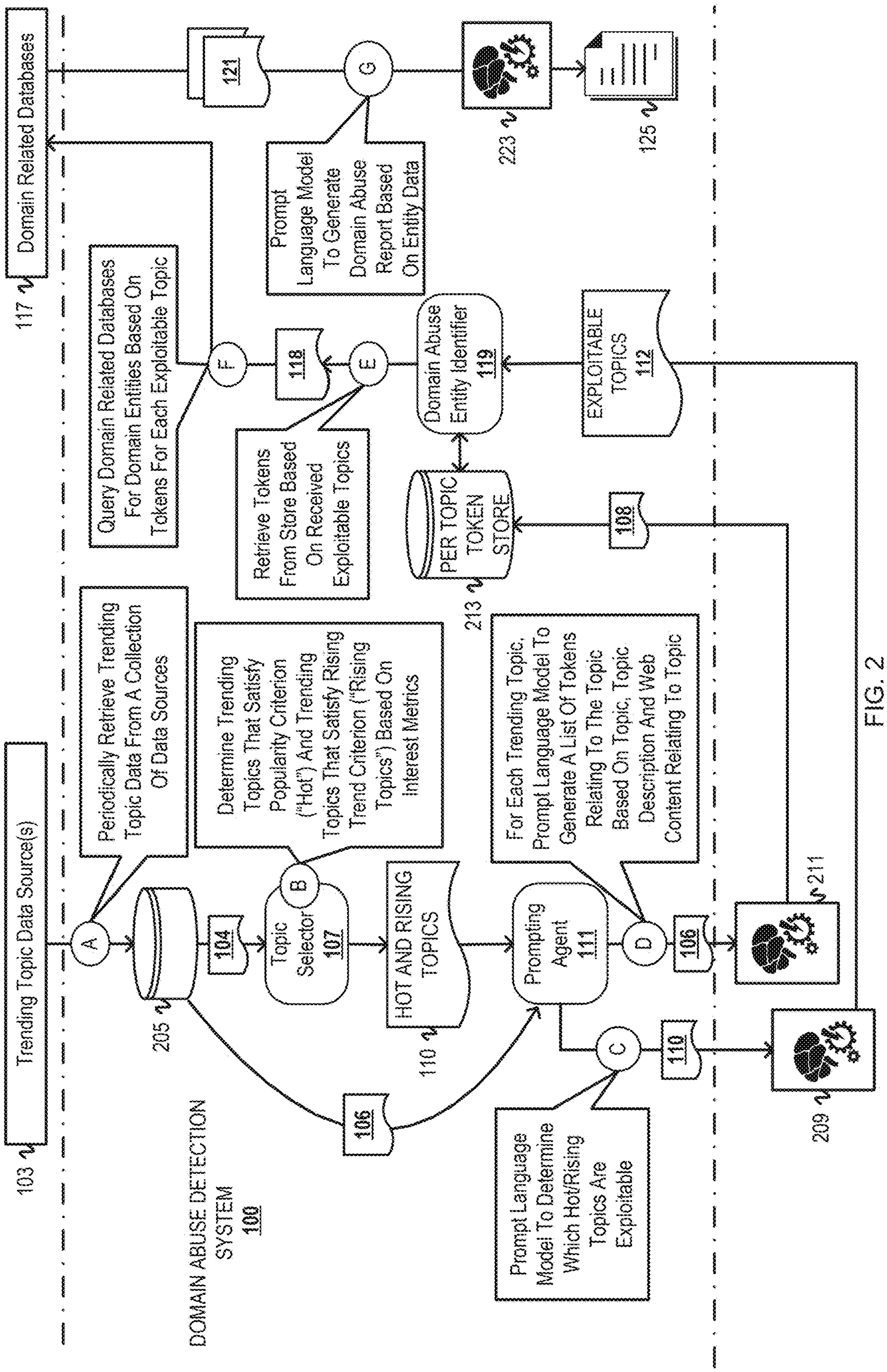
FIG. 2 is a diagram of components of the domain abuse detection system detecting abused and/or abusable domains and identifying corresponding entities.

FIGS. 1 and 2 are diagrams of a domain abuse detection system identifying abused or likely to be abused domains and corresponding entities based on analysis of trending topics. FIG. 1 is a diagram that illustrates a domain abuse detection system and general data flow among components of the domain abuse detection system and external components. FIG. 1 depicts a domain abuse detection system 100 including a datastore 105, a topic selector 107, a prompting agent 111, and a domain abuse entity identifier 119. The external components include a data source(s) 103, a language model 109, and domain related databases 117. The depicted includes the domain abuse detection system 100 receiving trending topic data 104 from the data source(s) 103 (e.g., a trending topics data source). In addition to topics, the trending topic data 104 includes interest metrics data. The topic selector 107 evaluates interest metrics data of trending topics and selects topics that satisfy a popularity criterion as "hot" topics and topics that satisfy a rising trend criterion as "rising" topics. The prompting agent 111 generates prompts and submits the prompts to the language model 109 to obtain tokens 108 based on trending topics, corresponding descriptors, and corresponding content 106 and to obtain exploitable topics 112 based on hot and rising topics and descriptors 110. Descriptors can be information such as a topic description, news snippets, news article titles, and uniform resource locators (URLs) of news sources. The domain abuse detection system 100 maintains trending topic data and corresponding tokens in the datastore 105 as status of a trending topic as hot or rising is dynamic. The domain abuse entity identifier 119 searches the domain related databases 117 with exploitable topics and corresponding tokens 118 to obtain entity data 121 (e.g., domain names, uniform resource locator (URLs), and network addresses) corresponding to abused or likely to be abused domains.

FIG. 2 is a diagram of components of the domain abuse detection system detecting abused and/or abusable domains and identifying corresponding entities. This description uses the terms "trend data" and "topic data" to refer to data which includes a topic label, topic attributes, user interest metrics and/or retrieved web content related to the topic. FIG. 2 is generally arranged in a similar manner to that of FIG. 1 but depicts more details of an illustrative example of detecting abused or likely to be abused domains and corresponding entities. While FIG. 1 depicts a single datastore 105 which stores both topic data as well as tokens, FIG. 2 depicts two separate datastores 205 and 213 as an alternative implementation. Also, FIG. 2 depicts multiple language models 209, 211, 223 for different tasks instead of a singular language model 109 for all tasks as depicted in FIG. 1. Again, this is another example of an alternative implementation.

FIG. 2 is annotated with a series of letters A-G, each of which represents stages of one or more operations. Although these stages are ordered for this example, the stages illustrate one example to aid in understanding this disclosure and should not be used to limit the claims. Subject matter falling within the scope of the claims can vary from what is illustrated.

At stage A, the domain abuse detection system 100 periodically retrieves trending topic data from the trending topic data sources 103. Examples of the data sources 103 include trend analysis services, information services (e.g., a new service), a search engine data source, and social media data source. Trending topic data at least includes a topic (i.e., topic name or topic label), one or more descriptors, and trending data. Examples of a topic descriptor include a description, a news snippet, a published article (e.g., news article, blog post, etc.) about the topic, a published article headline about the topic, etc. Trend data includes current data of interest/popularity metrics (e.g., likes, page visits, mentions, etc.) and historical time-series data of interest metrics. The domain abuse detection system 100 can retrieve trending topic data with application programming interface (API) requests according to the API of each of the data sources 103. The domain abuse detection system 100 is configured to retrieve different trending topic data at different frequencies or intervals. The domain abuse detection system 100 is configured to retrieve current data of interest metrics at a higher frequency (e.g., hourly) than historical time-series data of interest metrics (e.g., daily). The retrieved trending topic data is stored in the datastore 205.

At stage B, the topic selector 107 determines whether any trending topics in the datastore 205 satisfy a popularity criterion and whether any of the trending topics satisfy a rising topic criterion. The topic selector 107 evaluates the current interest metrics data of each trending topic against the popularity criterion to determine whether the popularity criterion is satisfied (e.g., minimum number of likes) and is a hot topic. The topic selector 107 evaluates the historical time-series interest metrics data against the rising trend criterion to determine whether the rising trend criterion is satisfied. This determination from different time-based perspectives of interest precisely captures trending topics with high likelihood of targeting for abuse.

At stage C, the prompting agent 111 prompts the language model 209 to determine which hot topics and rising topics are exploitable. The prompt instructs the language model 209 to determine whether each hot or rising topic is likely to be used by bad actors to generate abuse domains. The domain abuse detection system 100 then receives the exploitable topics 112 from the language model 209, which the prompting agent 111 passes to the domain abuse entity identifier 119.

At stage D, the prompting agent 111 retrieves the data 106 (i.e., trending topic, corresponding descriptors, and corresponding web content), and prompts the language model 211 to generate tokens for each trending topic based on the corresponding descriptors and web content related to the topic. Web content such as news articles can be retrieved by a web crawler (not depicted) invoked by the domain abuse detection system 100. The language model 211 responds with tokens 108. The domain abuse detection system 100 updates the token store 213 based on the tokens 108 from the language model 211. Updating can be adding a new list of tokens not previously in the token store 213 or updating a list of tokens in the token store 213 already associated with a trending topic.

At stage E, the domain abuse entity identifier 119 retrieves tokens from the token store 213 for each of the exploitable topics 112. The domain abuse entity identifier 119 associates the retrieved tokens with a corresponding one of the exploitable topics 112 to generate structured data 118 that indicates each exploitable topic and its corresponding tokens. For example, a topic "Olympics 2024" could have the matching tokens "paris2024, olympic games, summer olympics, and athletics".

At stage F, the domain abuse entity identifier 119 queries the domain related databases 117 based on the exploitable topics and the tokens 118 associated together in structured data 118. For each exploitable topic, the domain abuse entity identifier 119 searches the domain related databases 117 to identify one or more domain entities that match the combination of exploitable topic and each corresponding token or various combinations of tokens. Using the previous example of the exploitable topic "Olympic 2024", a query can indicate the exploitable topic and the token "paris2024", and receive results:

#1. "paris2024official.com"
#2. "2024parisolympicgames.net"
#3. "2024OlympicsParisInvitational.com"

The above example depicts three results that matched either the exact token (#1) or a variation of the token (#2 and #3). An entity corresponding to a domain or domain entity can be the domain URL, a hostname, or a network address. The results can also include entity data for the returned domain entities, such as registration status, data of registration, owner, etc. FIG. 2 depicts entity data 121 being returned as results to the querying by the domain abuse entity identifier. The entity data 121 is returned to the domain abuse detection system 100.

At stage G, the domain abuse entity identifier 119 prompts the language model 223 (using the prompting agent 111) to generate a domain abuse report 125 based on the entity data 121. In this example, the domain abuse detection system 100 uses the entity data 121 to generate a domain abuse report but in some cases, a domain abuse detection system 100 may perform additional analysis based on the additional information gathered on each domain entity, and then use that analysis to generate a domain abuse report. This case is further described in FIG. 6.

Figure 3:
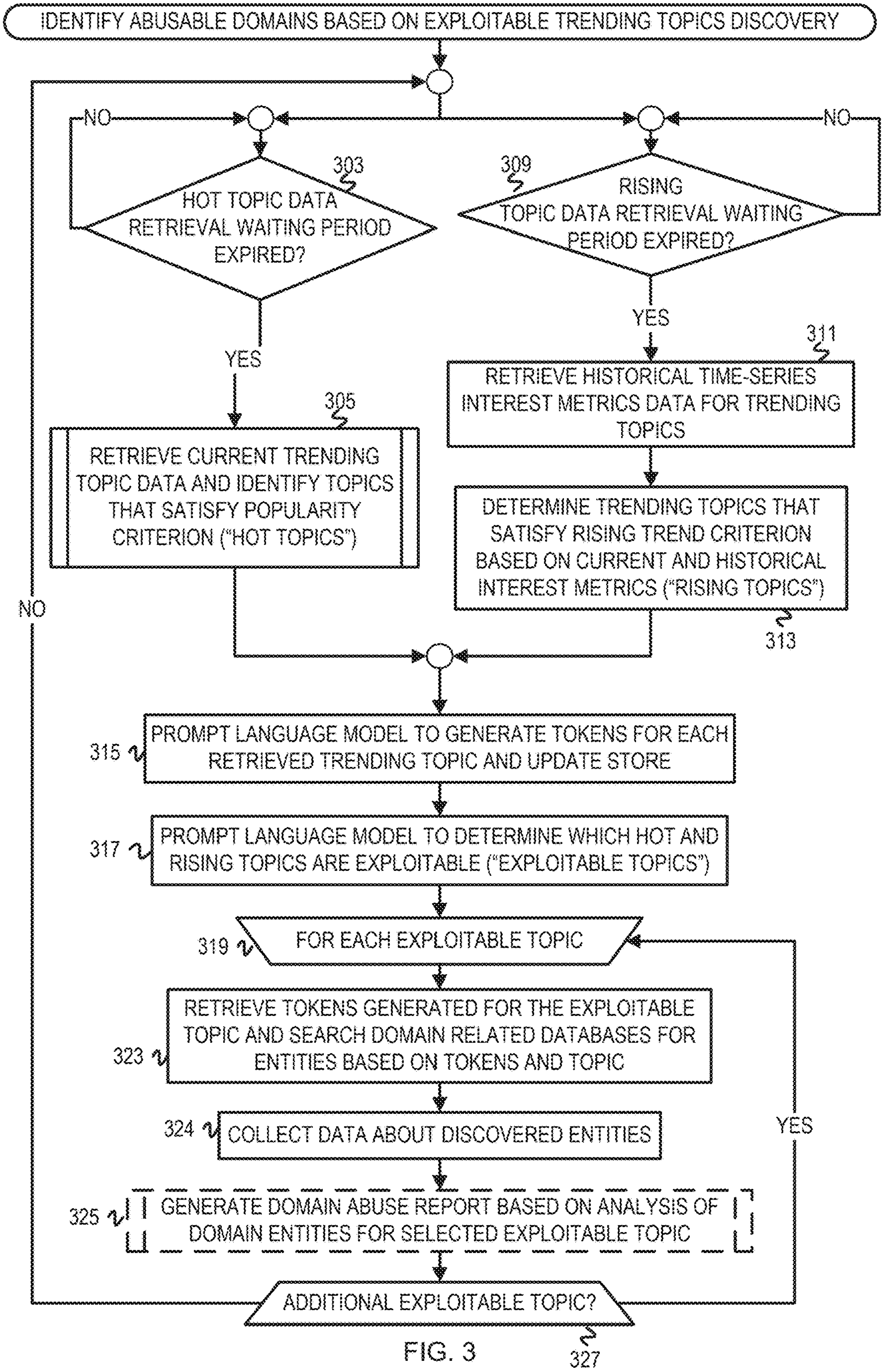
FIG. 3 is a flowchart of example operations for identifying abuse domains based on exploitable trending topic discovery.
Figure 4:
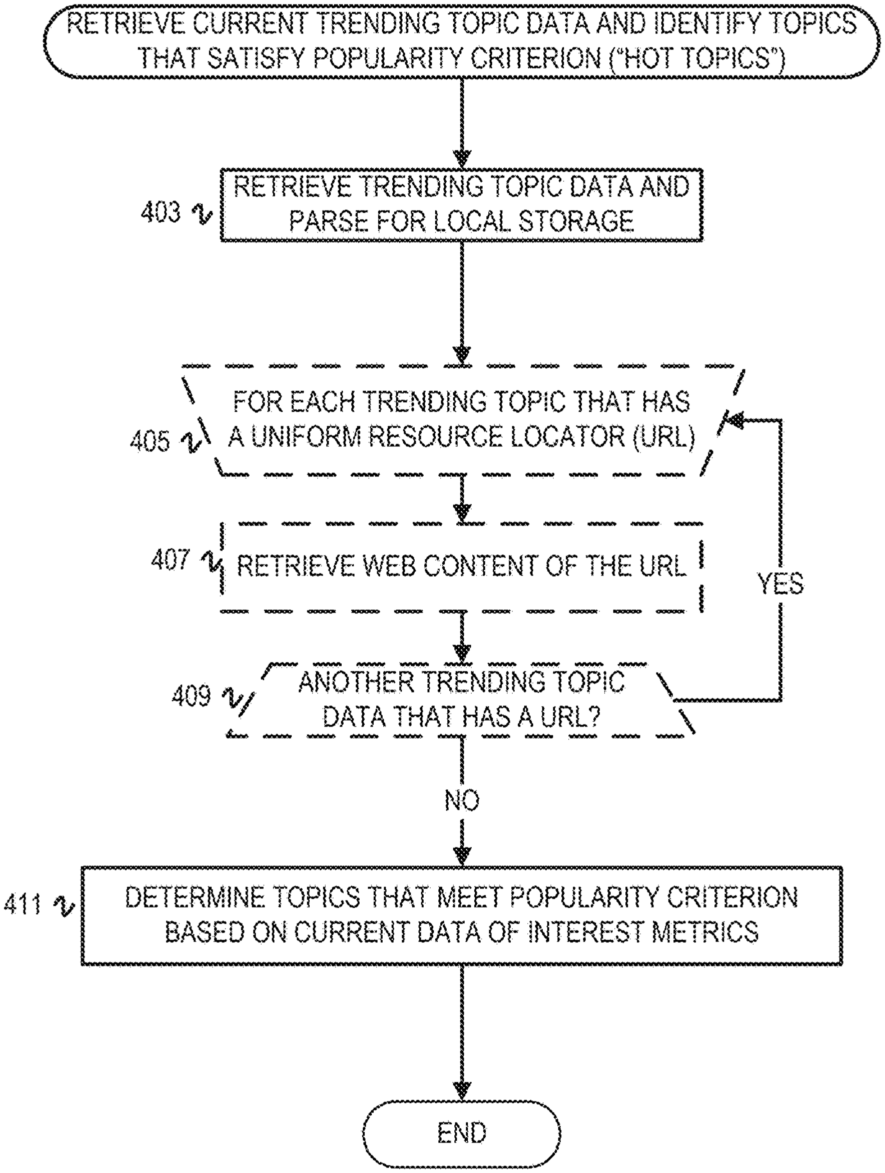
FIG. 4 is a flowchart of example operations for retrieving current trending topic data and identifying which topics are hot topics based on a popularity criterion.

FIGS. 3-4 are flowcharts of example operations related to the identification of abuse domains based on exploitable trending topic discovery. The example operations are described with reference to a domain abuse detection system for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for identifying abuse domains based on exploitable trending topic discovery. The operations described here assume that a domain abuse detection system has been configured to subscribe to a plurality of data sources to obtain trending topic data.

At block 303, the domain abuse detection system determines if a hot topic data retrieval waiting period has expired. The hot topic retrieval waiting period is defined at a time interval or granularity for the domain abuse detection system to have visibility of trending topics (e.g., every 30 minutes, every 3 hours, etc.). If the hot topic retrieval waiting period has expired, then operational flow continues at block 305, otherwise operational flow continues at block 303.

At block 305, the domain abuse detection system retrieves current trending topics data and identifies those of the trending topics that are hot topics. Examples operations that elaborate on this identification of hot topics are described in FIG. 4. Operational flow proceeds from block 305 to block 315.

At block 309, the domain abuse detection system determines if a rising topic data retrieval waiting period has expired. If the rising topic data retrieval waiting period has expired, then operational flow continues at block 311. Otherwise, operational flow continues at block 309.

At block 311, the domain abuse detection system retrieves historical time-series interest metric(s) data. The domain abuse detection system queries a data source(s) for each of the trending topics maintained/retrieved by the domain abuse detection system (block 305). Since the rising topic data retrieval waiting period is longer than the hot topic data retrieval waiting period, trending topic data will have already been retrieved. Thus, the domain abuse detection system can query, for each trending topic that has been retrieved, its historical time-series data of one or more interest metrics at a specified granularity. For example, the domain abuse detection system can query a data source for the amount of visited traffic of a website corresponding to a trending topic and number of mentions of the trending topic across social media sites every 12 days over a 200 week time period and number of mentions of the trending topic. The historical time-series interest metrics data can include samples at different granularities of time. In addition, some samples may be missing in a time interval. In light of missing values or different time granularities, implementations can resample (e.g., according to k-fold cross validation) or interpolate (e.g., bicubic interpolation) to generate additional values and normalize the metrics.

At block 313, the domain abuse detection system determines trending topics that satisfy rising trend criterion based on current and historical data of one or more interest metrics. The domain abuse detection system applies a trend analysis to measure growth in popularity of each trending topic and determines whether that measure satisfies the rising trend criterion. For instance, the rising trend criterion can be a minimum Z-score or test of whether a Z-score exceeds a defined Z-score threshold. To calculate the Z-score for a trending topic, the abuse detection system determines a mean of the measurements of interest in the trending topic for each time granularity across the time window (e.g., every week over 200 weeks). Implementations can normalize the measurements to account for age by applying weights that decrease the significance for older measurements. The domain abuse detection system can then calculate the Z-score according to the formula $$Z = \frac{x - \mu}{\sigma},$$

wherein x is the current interest measurement for the trending topic, μ is the mean of all interest measurements for the trending topic including the current and the historical measurements, and σ is the standard deviation of all interest measurements for the trending topic. Embodiments can calculate Z-scores across multiple metrics and aggregate the Z-scores and determine whether a majority of the Z-scores exceed the threshold. In addition, rising trend can be based on criteria including a Z-score that satisfies a defined threshold and on a R spike score exceeding a defined threshold. For example, a trending topic would be a rising topic if Z>z_threshold and R>r_threshold. The R spike can be calculated according to the formula $$R = \frac{x}{h},$$

wherein x is the current interest measurement for the trending topic and h is the maximum of all previous interest measurements for the trending topic excluding x. Operational flow proceeds to block 315.

In the case of either hot or rising topics, embodiments can regulate frequency of identification/selection of trending topics as hot or rising. The domain abuse detection system can maintain the store or cache of trending topics, the domain abuse detection system can also maintain a cache of trending topics that have been identified as hot or rising and associate with a timestamp when a trending topic was indicated as hot or rising. If a trending topic is in the cache, then the trending topic is not analyzed to determine whether the trending topic is hot or rising. After a defined cool down period (e.g., 2 days), the domain abuse detection system removes the trending topic from the cache to allow the trending topic to be identified as hot or rising again.

At block 315, the domain abuse detection system prompts a language model to generate tokens likely to be abused in a domain registration for each trending topic in the retrieved trending topic data and updates a store with tokens in the response from the language model. The domain abuse detection system can load a prompt template for instructing a language model to generate tokens likely to be abused in a domain registration corresponding to a topic in the prompt. The instruction in the prompt template can specify a quantity of tokens to generate with the context that the token would be part of a domain name registration likely to be abused. The prompt instructions can also specify constraints on the tokens (e.g., maximum words, minimum characters, etc.) and specify an output format. The domain abuse detection system then populates the template with at least the trending topic but can also include descriptors that provide more context to the topic and can be a topic description, one or more recent headlines, a snippet of recent article, etc. If the trending topic data includes a URL, then the domain abuse detection system can invoke a crawler to retrieve web content from the page corresponding to the URL. An example list of tokens for the topic "Olympics" could be: {Paris, 2024 Olympics, Athletics, Gold Medal, USA}. c.

At block 317, the domain abuse detection system prompts the language model (or another language model) to determine which hot and/or rising topics are exploitable. The prompt comprises the list of hot and/or rising topics, as well as the topic descriptors. Based on this information, the language model is instructed to indicate a determination of whether each topic is exploitable. This can be a yes/no determination in some implementations, or in other cases the prompt can instruct the language model to provide a more detailed determination. In some cases, the domain abuse detection system may build a prompt for each individual hot and/or rising topic to enhance the quality of the language model responses. The response from the language model will include a list of the topics which are determined to be exploitable in an output format specified by the prompt. The prompt can also include a categories of inclusion and exclusion in the analysis by the language model and an instruction to the language model to indicate a hot or rising topic as exploitable if it is within the inclusionary category and to indicate the topic is not exploitable if within the exclusionary category.

At block 319, the domain abuse detection system starts to iterate through each of the exploitable topics. For each selected exploitable topic, operational flow continues at block 323.

At block 323, the domain abuse detection system retrieves tokens generated for the exploitable topic and searches domain related databases for entities based on the tokens and exploitable topic. Domain related databases can include NRD (newly registered domains) databases, NOD (newly observed domain) databases, passive DNS record databases, and/or firewalls which have logs of domain entity information. The domain abuse detection system can perform different types of searches to identify domain entities that use different domain abuse techniques. A direct search can be performed to find domain entities which include the tokens exactly and searches based on techniques used by bad actors (e.g., typosquatting, homoglyph attack, etc.) can be performed. For example, if an exploitable topic was "Olympics", and the tokens for that exploitable topic included the token "paris 2024", then searches could find domain entities such as:

1. "paris2024Olympics.com"
2. "2024parisOlympics.com"
3. "parisOlympics2024.com"
4. "2O240llmpix,paris.com
5. "parrisOlympics2024.com"

As can be understood from these examples, tokens can appear in either exactly, as is the case in #1: "paris2024Olympics.com", or appear in domains in a reverse order such as #2: "2024parisOlympics". Additionally, a direct search can find domains which have sections of their domain name which separate individual pieces of the tokens, such as #3: "parisOlympics2024.com". While the example results are domain names, domain entities can be URLs associated with domain names (e.g., indicated in a CNAME record), network addresses, and hostnames.

At block 324, the domain abuse detection system collects data about entities discovered from searching the domain related databases. With the domain related entities discovered from searching the domain related databases based on the topics and tokens, the domain abuse detection system collects information for analysis. The domain abuse detection system can collect information from public databases (e.g., DNS records that indicate owners, registration data, first registered data, expirations, etc.) and public security feeds or databases. The domain abuse detection system can also collect data from private databases, such as security related data. Examples of the security related data include change request history, DNS verdicts, reputations, etc.

At block 325, the domain abuse detection system generates a domain abuse report based on the analysis of domain entities for the selected exploitable topic. The dashed line around this block indicates this is an optional operation. This operation is further described in FIG. 5.

At block 327, the domain abuse detection system determines if there is another exploitable topic to process. If there is another exploitable topic, operational flow continues at block 319. Otherwise, operational flow continues at block 303 and/or block 309 based on which waiting time has expired.

FIG. 4 is a flowchart of example operations for retrieving current trending topic data and identifying which topics are hot topics based on a popularity criterion. As stated in FIG. 3, the example operations of FIG. 4 recur at a defined interval to maintain a recent listing of trending topics.

At block 403, the domain abuse detection system retrieves trending topic data and parses the trending topic data for local storage. The trending topic data includes current data/measurements of interest for one or more interest metrics. The domain abuse detection system retrieves the trending topic data from multiple data sources. The retrieved trending topic data is likely structured by the data source or according to the request from the abuse detection system. The trending topic data can be aggregated into structured data that is parsed by the domain abuse detection system to separate and organize the trending topic data by trending topic. The domain abuse detection system delineates the trending topic data by the descriptors or topic metadata and interest measurements. Example metrics corresponding to the interest measurements include number of links corresponding to a trending topic, amount of follows, amount of network traffic across corresponding websites, and amount of mentions across social media sites. The domain abuse detection system stores the delineated trending topic data. The domain abuse detection system can maintain the retrieved trending topics data within a sliding time window. For example, the domain abuse detection system can limit storing of retrieved trending topic data to 1 week. The domain abuse detection system can maintain a trending timestamp to indicate when a topic was most recently indicated as trending. When the trending timestamp ages outside of the time window, the domain abuse detection system evicts the corresponding trending topic data.

FIG. 4 also depicts blocks 405, 407, 409 in dashed lines to indicate optional operations to gather additional trending topic data. In some cases, metadata for a trending topic will include a URL. For those cases, embodiments can retrieve web content as additional trending topic metadata.

At block 405, the domain abuse detection system begins to iterate through trending topics with URLs in the corresponding trending topic data. The URL(s) can reference news articles that relate to the topic, blog posts, periodical articles, a social media webpage, etc. For each trending topic data that has a URL, operational flow continues at block 407.

At block 407, the domain abuse detection system retrieves web content referenced by the URL. To retrieve the web content, the domain abuse detection system can invoke a web crawler which extracts the web content from a webpage referenced by the URL. Web content such as articles are retrieved because they provide more context for tokens generation.

At block 409, the domain abuse detection system determines if another trending topic has a URL. If there is another trending topic with a URL, then operational flow continues at block 405. Otherwise, operational flow continues at block 411.

At block 411, the domain abuse detection system identifies which trending topics are hot topics based on a popularity criterion. The trending topic data likes includes interest measurements for different metrics. The popularity criterion can vary by type of topic, use a single metric, aggregate of metrics, or multiple metrics individually. The domain abuse detection system can apply weights to several interest metrics to normalize and/or bias measurements of different interest metrics. The measurements can be aggregated to evaluate against a single threshold or evaluated against different thresholds.

With the domain entities discovered for exploitable topics, the domain entities can be monitored for malicious behavior. The entity data can be collected periodically and evaluated to determine whether the domain entity is being used for malicious purposes. The domain abuse detection can perform various analysis with the collected entity data. For instance, the domain abuse detection system can perform trend analysis, user interest analysis, and/or cluster analysis. The analysis can be used to identify malicious campaigns for generating reports to aid in the evaluation of the discovered domain entities. For example, the domain abuse detection system can run a cluster analysis of the collected domain entity. The abuse detection system can generate a matrix of embeddings for each discovered entity with the data collected for that entity (e.g., an embedding of registered data, domain name, Whois information, etc.). Each cluster of domain entities indicates a likely malicious domain abuse campaign. The domain abuse detection system can perform trend analysis on the collected entity data per discovered entity to determine trends in domain registrations, change requests, security verdicts, etc. The domain abuse detection system can perform user interest analysis to focus on certain domain entities. For example, the domain abuse detection system can perform user interest analysis to identify the n entities with the highest passive DNS traffic, the highest DNSSec traffic, and/or the highest security database traffic.

Information from analysis can be used to generate abuse reports. The domain abuse detection system can prompt a language model to generate a report for a specified one or more domain entities based on results of analysis. For example, the domain abuse detection system can use a prompt template that instructs a language model to generate a report in a specified format with provided analysis results and domain entities. In addition, the domain abuse detection system can have multiple prompt templates, each for a different perspective (e.g., domain registration perspective, security verdicts perspective, passive DNS traffic perspective, etc.). This determination can include instructions to the language model to articulate insights into how bad actors might be exploiting the exploitable topic. The domain abuse detection system does not require analysis to prompt a language model to generate an abuse report. The prompt may instruct the language model to generate a domain abuse report based on the domain entities or domain entities and collected entity data.

Variations

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 315 and 317 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example but not limited to, a system, apparatus, or device, which employs one or a combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
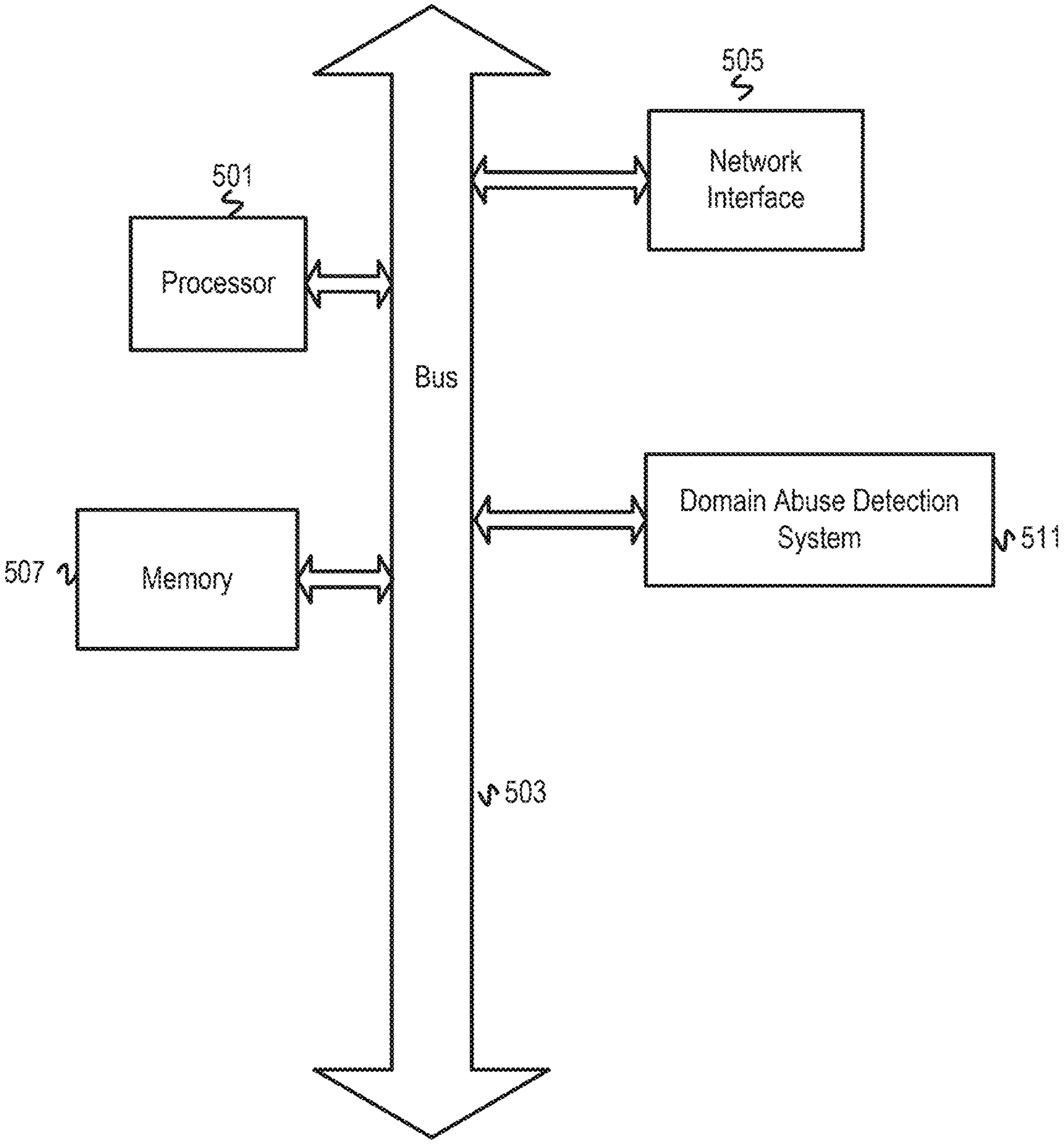
FIG. 5 depicts an example computer system with a domain abuse detection system.

FIG. 5 depicts an example computer system with a domain abuse detection system. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a domain abuse detection system 511. The domain abuse detection system 511 retrieves trending topic data from a plurality of data source(s) and then selects trending topics as hot or rising depending on interest measurements and criterion for the classification of hot or rising. The domain abuse detection system 511 interacts with one or more language models to generate tokens for each trending topic and to determine which of the hot topics and rising topics is exploitable. For each determined exploitable topic, the domain abuse detection system 511 retrieves the tokens generated for the exploitable topic and searches a plurality of domain related databases to discover domain entities likely to be abused. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:

identifying a plurality of trending topics and obtaining descriptive attributes of the plurality of trending topics, content related to the plurality of trending topics, and current data of interest metrics for the plurality of trending topics;

for each of the plurality of trending topics, prompting a first language model to generate tokens that could be used for malicious domain registration related to the trending topic, wherein the prompting is based, at least in part, on the obtained descriptive attributes of the trending topic and content related to the trending topic;

for each of the trending topics, obtaining historical data of interest metrics;

based on the current data of interest metrics, determining a first subset of the plurality of trending topics of which each satisfies a popularity criterion;

based on the historical data of interest metrics, determining a second subset of the plurality of trending topics of which each satisfies a rising trend criterion;

for each of the first and second subsets of trending topics, prompting the first language model or another language model to determine whether the trending topic is exploitable for malicious domain registration, wherein the prompting comprises generating a prompt with the descriptive attributes of the topic and a topic label;

for each topic determined to be exploitable, retrieving the tokens generated for the exploitable topic; and identifying a set of one or more entities based, at least partly, on searching a set of one or more domain related databases for the tokens and variations of the tokens.

2. The method of claim 1 further comprising analyzing data of the set of entities to detect domain abuse.

3. The method of claim 2, wherein analyzing data of the set of entities to detect domain abuse comprises, for at least a first of the set of entities, analyzing trends in traffic verdicts associated with the first entity and/or trends in domain registration verdicts corresponding to the first entity.

4. The method of claim 2, wherein analyzing data of the set of entities to detect domain abuse comprises clustering embeddings of the set of entities to identify potential campaigns of domain abuse, wherein the embeddings are generated from domain information and traffic data.

5. The method of claim 2 further comprising prompting the first language model or another language model to generate a report of domain abuse based on at least a first of the exploitable topics, the descriptive attributes of the first exploitable topic, and the analysis of the data of the first exploitable topic.

6. The method of claim 1 further comprising filtering out from the first and second subset of trending topics any topic indicated in a first list and/or indicating as exploitable any trending topic of the first or second subset of trending topics that occurs in a second list.

7. The method of claim 1 further comprising maintaining a store of exploitable topics and corresponding tokens, wherein maintaining the store comprises accumulating tokens across runs of prompting the first language model to identify exploitable topics.

8. The method of claim 1, wherein determining the first subset of trending topics is at a first cadence and determining the second subset of trending topics is at a second cadence that is longer than the first cadence.

9. A non-transitory, machine-readable medium having program code stored thereon, the program code comprising instructions to:

obtain descriptive attributes of a plurality of trending topics and content related to the plurality of trending topics;

for each of the plurality of trending topics, prompt a first language model to generate tokens that could be used for malicious domain registration related to the trending topic, wherein the instructions to prompt comprise the instructions to prompt with the obtained descriptive attributes of the trending topic and the content related to the trending topic;

determine which of the plurality of trending topics satisfies a popularity criterion based on current data of interest metrics for the plurality of trending topics;

determine which of the plurality of trending topics satisfies a rising trend criterion based on historical data of interest metrics of the plurality of trending topics;

for each of the plurality of trending topics that satisfies either the popularity criterion or the rising trend criterion, prompt the first language model or another language model to determine whether the trending topic is exploitable for malicious domain registration, wherein the instructions to prompt comprise instructions to prompt with the descriptive attributes of the topic and a topic label;

for each topic determined to be exploitable, retrieve the tokens generated for the exploitable topic; and identify a set of one or more entities based, at least partly, on searching a set of one or more domain related databases for the tokens and variations of the tokens.

10. The non-transitory, machine-readable medium of claim 9, wherein the program code further comprises instructions to, for at least a first of the set of entities, analyze trends in traffic verdicts associated with the first entity and/or trends in domain registration verdicts corresponding to the first entity.

11. The non-transitory, machine-readable medium of claim 10, wherein the program code further comprises instructions to cluster embeddings of the set of entities to identify potential campaigns of domain abuse, wherein the embeddings are generated from domain information and traffic data.

12. The non-transitory, machine-readable medium of claim 10, wherein the program code further comprises instructions to analyze data of the set of entities and to prompt the first language model or another language model to generate a report of domain abuse based on at least a first of the exploitable topics, the descriptive attributes of the first exploitable topic, and the analysis of the data of the first exploitable topic.

13. The non-transitory, machine-readable medium of claim 9, wherein the program code further comprises instructions to filter out from the trending topics that satisfy either the popularity criterion or the rising trend criterion any topic indicated in a first list and/or indicate as exploitable any of the trending topics satisfy either the popularity criterion or the rising trend criterion that occurs in a second list.

14. The non-transitory, machine-readable medium of claim 9, wherein the instructions to determine which of the plurality of trending topics satisfies the popularity criterion or the rising trend criterion comprise the instructions to determine which of the plurality of trending topics satisfies the popularity criterion more frequently than which of the plurality of trending topics satisfies the rising trend criterion.

15. An apparatus comprising:

a processor; and a machine-readable medium having instructions stored thereon, the instructions executable by the processor to cause the apparatus to, obtain descriptive attributes of a plurality of trending topics and content related to the plurality of trending topics;

for each of the plurality of trending topics, prompt a first language model to generate tokens that could be used for malicious domain registration related to the trending topic, wherein the instructions to prompt comprise the instructions to prompt with the obtained descriptive attributes of the trending topic and the content related to the trending topic;

determine which of the plurality of trending topics satisfies a popularity criterion based on current data of interest metrics for the plurality of trending topics;

determine which of the plurality of trending topics satisfies a rising trend criterion based on historical data of interest metrics of the plurality of trending topics;

for each of the plurality of trending topics that satisfies either the popularity criterion or the rising trend criterion, prompt the first language model or another language model to determine whether the trending topic is exploitable for malicious domain registration, wherein the instructions to prompt comprise instructions to prompt with the descriptive attributes of the topic and a topic label;

for each topic determined to be exploitable, retrieve the tokens generated for the exploitable topic; and identify a set of one or more entities based, at least partly, on searching a set of one or more domain related databases for the tokens and variations of the tokens.

16. The apparatus of claim 15, wherein the machine-readable medium further comprises instructions executable by the processor to cause the apparatus to, for at least a first of the set of entities, analyze trends in traffic verdicts associated with the first entity and/or trends in domain registration verdicts corresponding to the first entity.

17. The apparatus of claim 16, wherein the machine-readable medium further comprises instructions executable by the processor to cause the apparatus to cluster embeddings of the set of entities to identify potential campaigns of domain abuse, wherein the embeddings are generated from domain information and traffic data.

18. The apparatus of claim 16, wherein the machine-readable medium further comprises instructions executable by the processor to cause the apparatus to analyze data of the set of entities and to prompt the first language model or another language model to generate a report of domain abuse based on at least a first of the exploitable topics, the descriptive attributes of the first exploitable topic, and the analysis of the data of the first exploitable topic.

19. The apparatus of claim 15, wherein the machine-readable medium further comprises instructions executable by the processor to cause the apparatus to filter out from the trending topics that satisfy either the popularity criterion or the rising trend criterion any topic indicated in a first list and/or indicate as exploitable any of the trending topics satisfy either the popularity criterion or the rising trend criterion that occurs in a second list.

20. The apparatus of claim 15, wherein the instructions to determine which of the plurality of trending topics satisfies the popularity criterion or the rising trend criterion comprise the instructions being executable by the processor to cause the apparatus to determine which of the plurality of trending topics satisfies the popularity criterion more frequently than which of the plurality of trending topics satisfies the rising trend criterion.

* * * * *